(12) United States Patent
Xiao et al.

(10) Patent No.: US 10,712,271 B2
(45) Date of Patent: Jul. 14, 2020

(54) PLASMONIC MICROPILLAR ARRAY WITH EMBEDDED NANOPARTICLES FOR LARGE AREA CELL FORCE SENSING

(71) Applicant: The Regents of the University of California, Oakland, CA (US)

(72) Inventors: Fan Xiao, Irvine, CA (US); Pei-Yu E. Chiou, Los Angeles, CA (US)

(73) Assignee: The Regents of the University Califnrnia, Oakland, CA (US)

( * ) Notice: Subject to any disclaimer, the term of this patent is extended or adjusted under 35 U.S.C. 154(b) by 0 days.

(21) Appl. No.: 15/747,088

(22) PCT Filed: Jul. 14, 2016

(86) PCT No.: PCT/US2016/042327
§ 371 (c)(1),
(2) Date: Jan. 23, 2018

(87) PCT Pub. No.: WO2017/015063
PCT Pub. Date: Jan. 26, 2017

(65) Prior Publication Data
US 2018/0372635 A1 Dec. 27, 2018

Related U.S. Application Data

(60) Provisional application No. 62/196,172, filed on Jul. 23, 2015.

(51) Int. Cl.
G01N 21/47 (2006.01)
G01N 21/64 (2006.01)
G01N 21/552 (2014.01)

(52) U.S. Cl.
CPC ......... G01N 21/648 (2013.01); G01N 21/554 (2013.01)

(58) Field of Classification Search
CPC .. G01N 21/474; G01N 21/4738; G01N 21/55; G01N 21/57; G01N 21/8483
USPC ........................................................ 356/446
See application file for complete search history.

(56) References Cited

U.S. PATENT DOCUMENTS

| | | | |
|---|---|---|---|
| 2009/0186776 A1 | 7/2009 | Webb et al. | |
| 2011/0128536 A1 | 6/2011 | Bond et al. | |
| 2012/0092660 A1 | 4/2012 | Wu et al. | |
| 2012/0281957 A1* | 11/2012 | Chamanzar | ............ B82Y 20/00 385/131 |

(Continued)

FOREIGN PATENT DOCUMENTS

WO    WO 2017/015063 A1    1/2017

OTHER PUBLICATIONS

PCT International Search Report and Written Opinion dated Oct. 26, 2016 issued in PCT/US2016/042327.

(Continued)

*Primary Examiner* — Md M Rahman
(74) *Attorney, Agent, or Firm* — Tom Hunter; Weaver Austin Villeneuve & Sampson LLP

(57) ABSTRACT

In various embodiments a plasmonic cell force sensor platform is provided where the platform comprises a plurality of micropillars, where micropillars comprising the plurality of micropillars each have a nanoparticle (e.g., a plasmonic nanoparticle, a fluorescent nanoparticle, etc.) disposed at the tip.

10 Claims, 13 Drawing Sheets

(a) Grow thermal oxide (b) Pattern photoresist (c) Etch SiO₂

(d) Etch Si and Remove SiO₂

(e) Silane surface treatment (f) Pour PDMS and cure (g) Silane surface treatment (h) Deposit gold (i) Remove top surface gold (j) Silane treatment again (k) Pour PDMS and cure (l) Trigger laser pulses PDMS Mold (Hole)

* * * * * *

PDMS pillar

(56) References Cited

U.S. PATENT DOCUMENTS

| | | | | |
|---|---|---|---|---|
| 2013/0230879 A1* | 9/2013 | Neeves | ............ | B01L 3/502761 435/29 |
| 2014/0220555 A1 | 8/2014 | Chen et al. | | |
| 2014/0349330 A1* | 11/2014 | Fayol | ................... | C12N 5/0062 435/29 |
| 2014/0352382 A1 | 12/2014 | Wang et al. | | |
| 2015/0197720 A1* | 7/2015 | Chiou | ................... | C12M 35/02 435/173.6 |
| 2015/0342523 A1* | 12/2015 | Baik | ................... | A61B 5/6801 600/595 |
| 2016/0167331 A1* | 6/2016 | Yang | ..................... | C09J 163/00 428/206 |
| 2018/0042866 A1* | 2/2018 | Boor | ................... | A61K 9/0014 |

OTHER PUBLICATIONS

PCT International Preliminary Report on Patentability dated Jan. 23, 2018 issued in PCT/US2016/042327.

Brugues et al., (2014) "Forces driving epithelial wound healing", *Nature Physics*, 10: 683-690.

Dahl et al., (2010) "In the middle of it all: mutual mechanical regulation between the nucleus and the cytoskeleton", *J. Biomechanics*, 43(1): 2-8.

Fu et al., (2010) "Mechanical regulation of cell function with geometrically modulated elastomeric substrates", *Nature methods*, 7(9): 733-736 [NIH Public Access—Author Manuscript—12 pages].

Ghibaudo et al., (2008) "Traction forces and rigidity sensing regulate cell functions", *Soft Matter*, 4: 1836-1843.

Hoorn et al., (2014) "The nanoscale architecture of force-bearing focal adhesions", *Nano Lett.*, 14: 4257-4262.

Liu et al., (2010) "Mechanical tugging force regulates the size of cell—cell junctions", PNAS, 107(22): 9944-9949.

Rabodzey et al., (2008) "Mechanical forces induced by the transendothelial migration of human neutrophils", *Biophysical Journal*, 95(3): 1428-1438.

Roure et al., (2005) "Force mapping in epithelial cell migration", *PNAS*, 102(7): 2390-2395.

Saez et al., (2007) "Rigidity-driven growth and migration of epithelial cells on microstructured anisotropic substrates", *PNAS*, 104(20): 8281-8286.

Saez et al., (2010) "Traction forces exerted by epithelial cell sheets", *J. Phys.: Condens. Matter*, 22: 194119 (9 pages).

Sun et al., (2012) "Mechanics regulates fate decisions of human embryonic stem cells", PLoS One, 7(5): e37178 (7 pages).

Tan et al., (2003) "Cells lying on a bed of microneedles: an approach to isolate mechanical force", *PNAS*, 100(4): 1484-1489.

Trepat et al., (2009) "Physical forces during collective cell migration", *Nature Physics*, 5: 426-430.

Yang et al., (2007) "Geometric considerations of micro- to nanoscale elastomeric post arrays to study cellular traction forces", *Adv. Mater.*, 19: 3119-3123.

\* cited by examiner

Overall View

Dark Field Image

Before demolding

After demolding

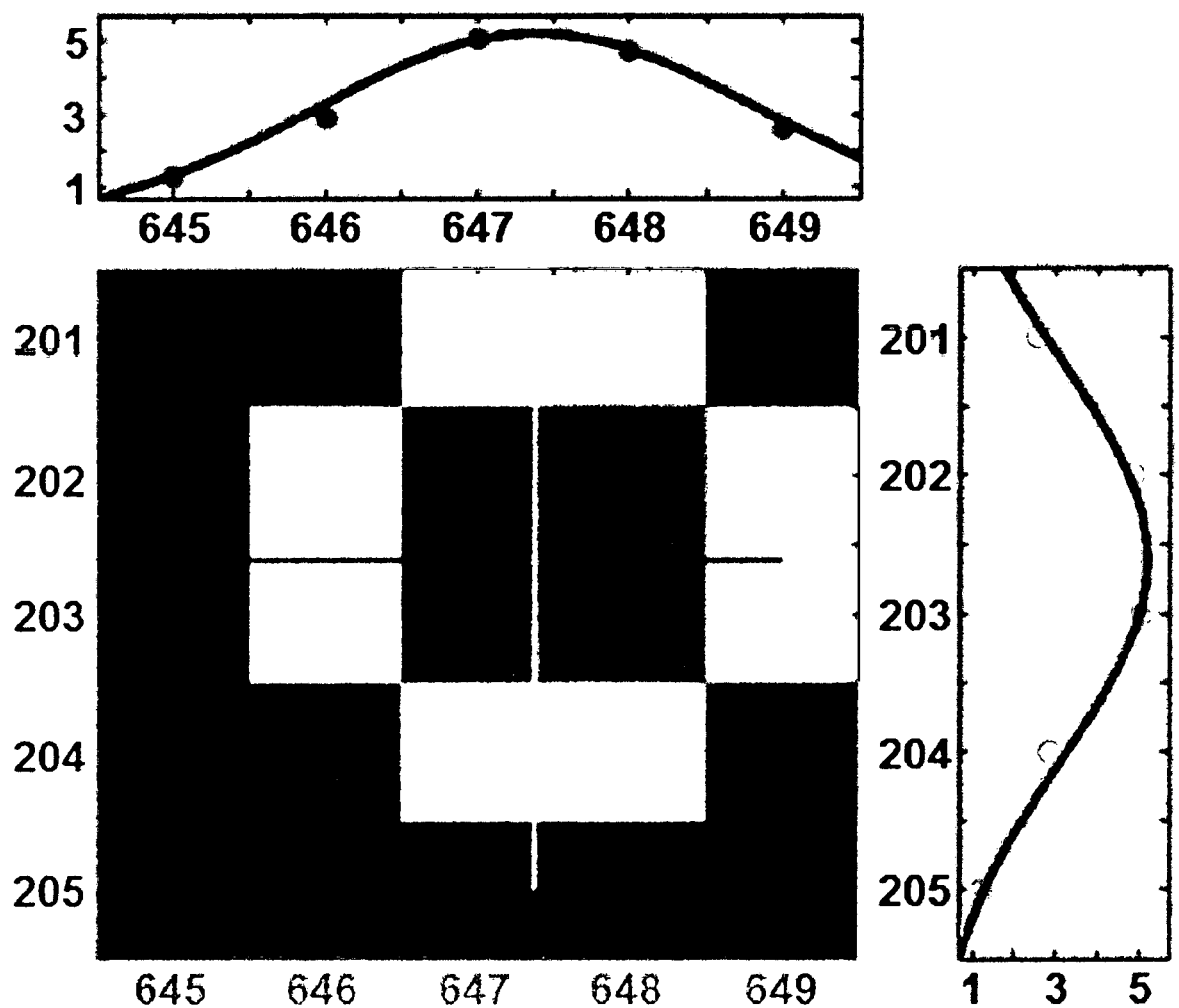
Fig. 5, cont'd.

A) Reference Image

B) Cell image + Fluorescent image

C) Displacement
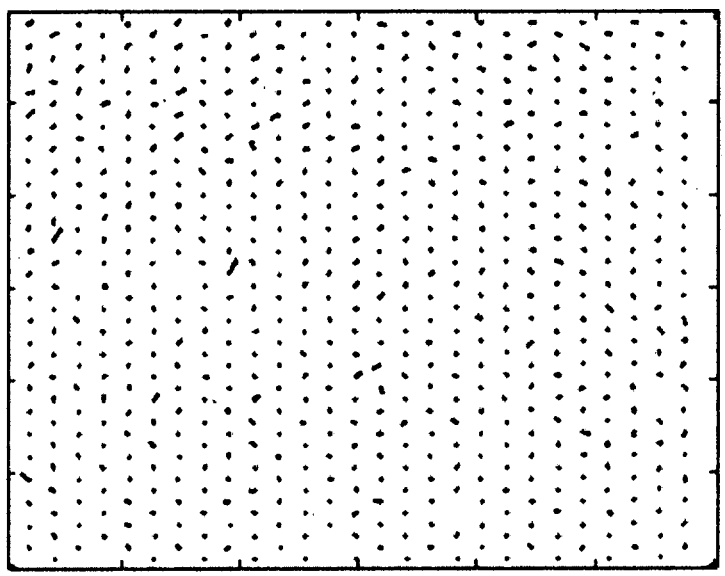
D) Histogram of displacement
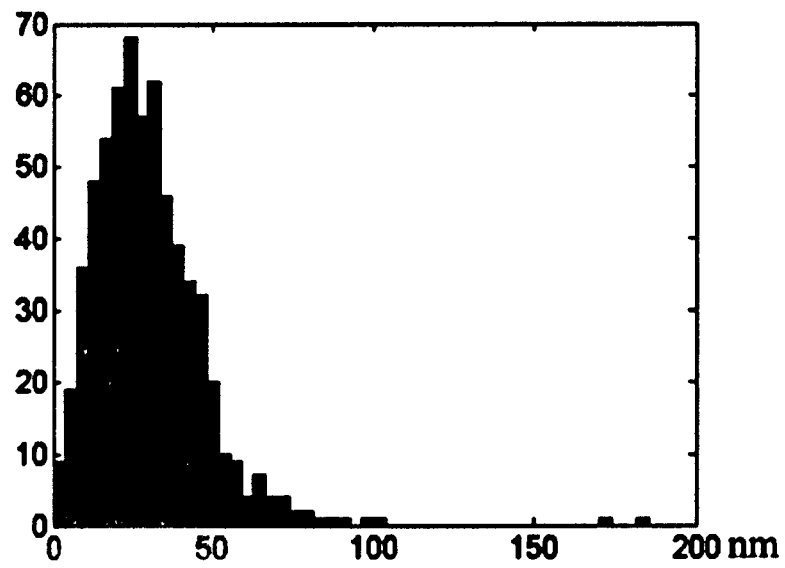
*Fig. 6, cont'd.*

A) Reference Image

B) Cell image + Fluorsecent Image

C) Displacement
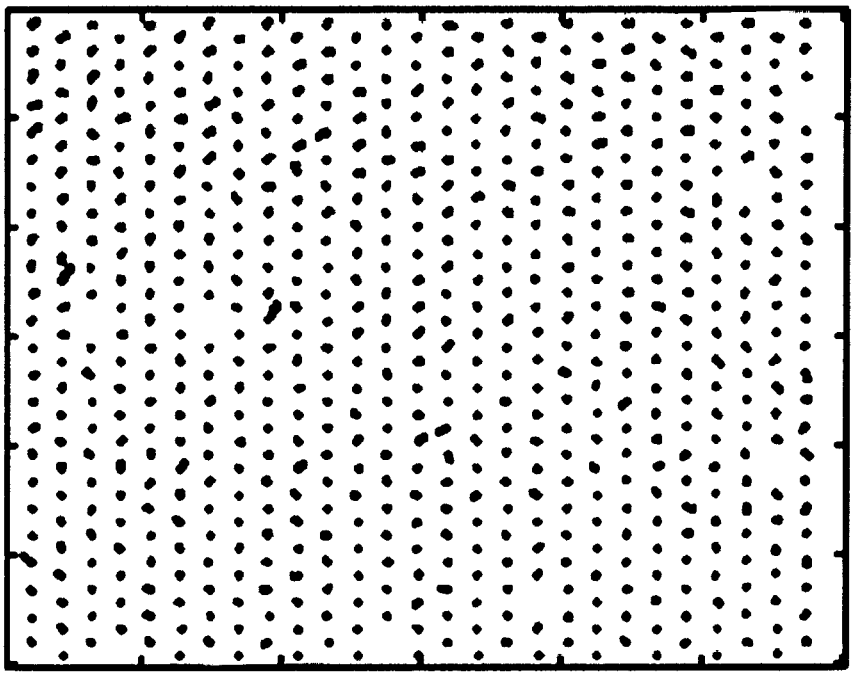
D) Histogram of displacement
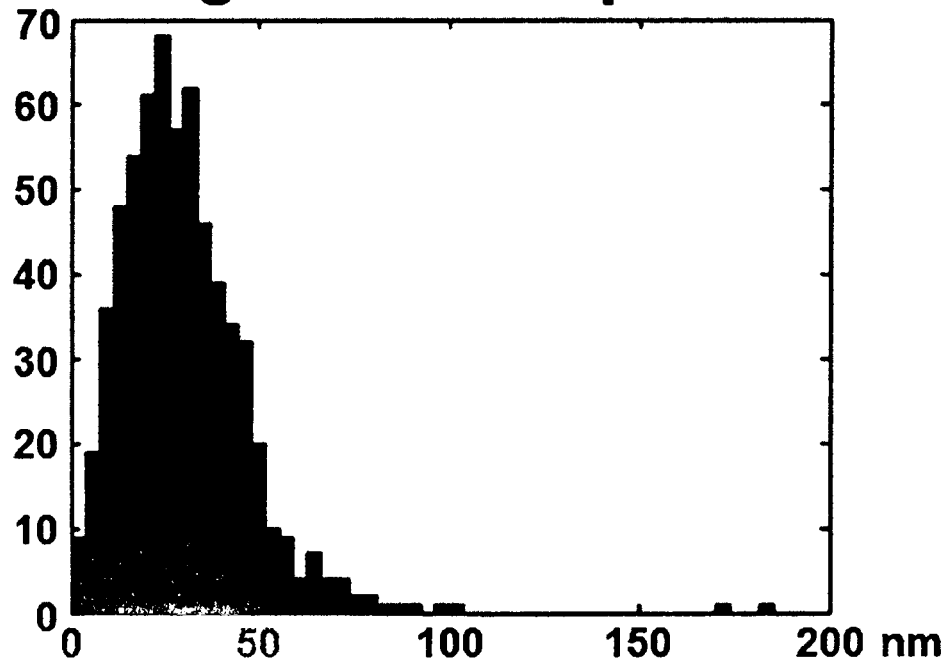
*Fig. 7, cont'd.*

PLASMONIC MICROPILLAR ARRAY WITH EMBEDDED NANOPARTICLES FOR LARGE AREA CELL FORCE SENSING

CROSS-REFERENCE TO RELATED APPLICATIONS

This application is a U.S. 371 National Phase of PCT/US2016/042327, filed on Jul. 14, 2016, which claims benefit of and priority to U.S. Ser. No. 62/196,172, filed on Jul. 23, 2015, both of which are incorporated herein by reference in their entirety for all purposes.

STATEMENT OF GOVERNMENTAL SUPPORT

This invention was made with government support under GM114188, awarded by the National Institutes of Health. The Government has certain rights in the invention.

BACKGROUND

Microfabricated elastic pillar substrates of various geometries have been widely applied to address many fundamental questions in cell biology regarding the mechanotransduction of cell functions. The tip of pillar is usually fluorescently labeled to obtain high contrast between the pillar and the background of the image. An intensity profile of the fluorescent pillar tips is then modeled by a two-dimensional Gaussian fitting to obtain the pillar position and therefore the pillar deflection produced by cells growing on top of the pillars. Local traction force can be calculated as the produced of the amount of pillar deflection and pillar stiffness. Objective lenses with high magnification (e.g., larger than 60×) are usually used to get a good position resolution of (30~50 nm of the pillar. However, the coated fluorescent proteins are often non-uniform on a pillar or across pillars. Furthermore, they can be degraded and/or digested by the cells, and dissolved in the media especially during the media swapping. Therefore the quality of fluorescent image is degraded in a time dependent manner, which will affect the accuracy of dynamic cell force measurement. Besides, for objects larger than the optical diffraction limit of the optical system used for imaging, it's not appropriate to use a simple Gaussian fitting to find the center of a pillar since the profile of pixel intensities cannot be described by a Gaussian function. Such an optical system with high magnification objectives have limited field of view and makes it incapable of monitoring large scale concurrent and instantaneous collective cell behavior.

SUMMARY

In various embodiments a novel plasmonic cell force sensor platform with superior force sensing accuracy across a large area is provided. In certain embodiments the force sensor platform comprises a plurality of micropillars having a nanoparticle disposed at the tip (e.g., embedded at the tip). In certain embodiments the embedded nanoparticles, provide strong plasmonic scattering which provides a strong signal-to-noise ratio and a point-source-like image pattern for sub-pixel resolution tracing even under a low magnification objective lens.

Various embodiments contemplated herein may include, but need not be limited to, one or more of the following:

Embodiment 1

A plasmonic cell force sensor platform, said platform including a plurality of micropillars, wherein micropillars including said plurality of micropillars each have a nanoparticle (e.g., a nanoparticle that can produce an optical signal) disposed at the tip.

Embodiment 2

The cell force sensor platform of embodiment 1, wherein said nanoparticle is a plasmonic nanoparticle.

Embodiment 3

The cell force sensor platform according to any one of embodiments 1-2, wherein said micropillars range in average diameter from about 0.1 µm, or about 0.5 µm, or about 1 µm up to about 15 µm, or up to about 10 µm, or up to about 5 µm.

Embodiment 4

The cell force sensor platform according to any one of embodiments 1-3, wherein the average diameter of said micropillars is about 2 µm.

Embodiment 5

The cell force sensor platform according to any one of embodiments 1-4, wherein said micropillars range in average length from about 1 µm up, or from about 2 µm, or from about 5 µm, up to about 100 µm, or up to about 75 µm, or up to about 50 µm, or up to about 40 µm, or up to about 30 µm, or up to about 20 µm, or up to about 15 µm, or up to about 10 µm.

Embodiment 6

The cell force sensor platform according to any one of embodiments 1-4, wherein the average length of said micropillars is about 10 µm.

Embodiment 7

The cell force sensor platform according to any one of embodiments 1-4, wherein the average length of said micropillars is about 7 µm.

Embodiment 8

The cell force sensor platform according to any one of embodiments 1-7, wherein the spacing between adjacent micropillars ranges from about 0.5 µm up to about 25 µm, or from about 1 µm up to about 20 µm, or from about 2 µm up to about 15 µm, or from about 3 µm up to about 10 µm.

Embodiment 9

The cell force sensor platform of embodiment 8, wherein the spacing between adjacent micropillars ranges from about 2 µm up to about 5 µm.

Embodiment 10

The cell force sensor platform of embodiment 8, wherein the spacing between adjacent micropillars is about 4 µm.

Embodiment 11

The cell force sensor platform according to any one of embodiments 1-10, wherein the size range of said plasmonic nanoparticle ranges from about 20 nm up to about 1000 nm in diameter (or longest dimension).

Embodiment 12

The cell force sensor platform according to any one of embodiments 1-11, wherein said nanoparticles includes a material selected from the group consisting of ruthenium, rhodium, palladium, silver, osmium, iridium, platinum, gold, copper, titanium, tungsten or an alloy, oxide, or nitride thereof.

Embodiment 13

The cell force sensor platform of embodiment 12, wherein said nanoparticles comprise gold or silver.

Embodiment 14

The cell force sensor platform of embodiment 12, wherein said nanoparticles comprise gold.

Embodiment 15

The cell force sensor platform according to any one of embodiments 1-14, wherein all micropillars comprise the same material nanoparticle.

Embodiment 16

The cell force sensor platform according to any one of embodiments 1-14, wherein different micropillars comprise different nanoparticle materials to provide different and distinguishable signals.

Embodiment 17

The cell force sensor platform according to any one of embodiments 1-16, wherein said micropillars are fabricated from a flexible polymer.

Embodiment 18

The cell force sensor platform of embodiment 17, wherein said micropillars are fabricated from a material selected from the group consisting of polydimethylsiloxane (PDMS), polyolefin plastomer (POP), perfluoropolyethylene (PFPE), polyurethane, polyimides, and cross-linked NOVOLAC® (phenol formaldehyde polymer) resins, polyolefin plastomers, perfluoropolyethylene, polyurethane, polyimides, cross-linked phenol/formaldehyde polymer resins, and thiol-ene based polymers.

Embodiment 19

The cell force sensor platform of embodiment 17, wherein said micropillars are fabricated from PDMS.

Embodiment 20

The cell force sensor platform according to any one of embodiments 1-19, wherein said platform provides a pillar position accuracy of at least about 60 nm, or at least about 50 nm, or at least about 40 nm, or at least about 30 nm, or at least about 20 nm, or at least about 10 nm under a 20× objective lens.

Embodiment 21

The cell force sensor platform of embodiment 20, wherein said platform provides a pillar position accuracy of about 30 nm under a 20× objective lens.

Embodiment 22

The cell force sensor platform according to any one of embodiments 20-21, wherein said accuracy is under a 20× objective lens with a field of view (FOV) of 450 μm×340 μm.

Embodiment 23

The cell force sensor platform according to any one of embodiments 1-22, wherein said platform provides a force resolution of at least about 400 pN.

Embodiment 24

The cell force sensor platform according to any one of embodiments 1-23, wherein said platform includes at least 10 micropillars, or at least 20 micropillars, or at least 50 micropillars, or at least 100 micropillars, or at least 250 micropillars, or at least 500 micropillars, or at least 1,000 micropillars, or at least 2,500 micropillars, or at least 5,000 micropillars.

Embodiment 25

The cell force sensor platform according to any one of embodiments 1-24, wherein said micropillars are disposed over an area ranging up to about 20 $cm^2$, or up to about 15 $cm^2$, or up to about 10 $cm^2$, or up to about 5 $cm^2$, or up to about 2 $cm^2$, or up to about 1 $cm^2$.

Embodiment 26

A method of fabricating a cell force sensor platform according to any one of embodiments 1-25, said method comprising:
  preparing an array of wells that form a negative mold for a micropillar array;
  depositing a nanofilm (e.g., a metal nanofilm) over said negative mold wherein said nanofilm includes the material (e.g., metal) that will form the nanoparticles;
  removing the nanofilm material on the mold surface leaving microdisks (e.g., metal microdisks) in the bottom of the wells of said negative mold;
  filling the negative mold with a polymer that is to form the micropillars; and melting the microdisks which transfer onto the tips of the micropillars formed by said polymer and form nanoparticles on the micropillars; and
  removing the micropillar array from the negative mold.

Embodiment 27

The method of embodiment 26, wherein preparing an array of wells includes casting said negative mold using a soft lithography polymer on a positive master mold.

Embodiment 28

The method of embodiment 27, wherein said soft lithography polymer is PDMS.

Embodiment 29

The method according to any one of embodiments 27-28, wherein said master mold is formed by etching a silicon substrate.

Embodiment 30

The method according to any one of embodiments 26-29, wherein said depositing a metal nanofilm includes depositing includes depositing one or more layers of metal including a metal selected from the group consisting of ruthenium, rhodium, palladium, silver, osmium, iridium, platinum, gold, copper, titanium, tungsten or an alloy, oxide, or nitride thereof.

Embodiment 31

The method according to any one of embodiments 26-30, wherein said depositing a metal nanofilm includes depositing a multi-layer metal nanofilm.

Embodiment 32

The method of embodiment 31, wherein said multilayer metal nanofilm is an $SiO_2$/Ti/Au multilayer nanofilm.

Embodiment 33

The method according to any one of embodiments 26-32, wherein said removing includes using tape to remove metal on the mold surface.

Embodiment 34

The method according to any one of embodiments 26-33, wherein said melting is by irradiation with laser pulses.

Embodiment 35

The method of embodiment 34, wherein said melting is by irradiation with nanosecond laser pulses.

Embodiment 36

A method of measuring the stiffness of cells and/or forces exerted by cells, said method comprising:
providing cells on a cell force sensor platform according to any one of embodiments 1-25, wherein said cells are disposed on said platform; and
determining the deformation of pillars including said platform in response to said cells; and converting the deformation of said pillars into a force exerted by said cells and/or the stiffness of said cells.

Embodiment 37

A method of delivering an agent into a cell, said method comprising:
providing cells on a cell force sensor platform according to any one of embodiments 1-25, wherein said cells are disposed on said platform;
contacting said cells with said agent; and exposing a region of said platform to electromagnetic radiation thereby inducing heating of said nanoparticles where said heating forms bubbles that introduce openings in the membrane of cells in the heated region resulting in the delivery of said agent into those cells.

Embodiment 38

The method of embodiment 37, wherein said cells are contacted with said agent by providing said agent in culture medium surrounding the cells.

Embodiment 39

The method according to any one of embodiments 37-38, wherein said exposing includes exposing a region of said platform to a laser pulse.

Embodiment 40

The method according to any one of embodiments 37-39, wherein said agent is selected from the group consisting of a nucleic acid, a chromosome, a protein, a label, an organelle, and a small organic molecule.

Embodiment 41

A system for selectively delivering an agent into a cell, said system including: a cell force sensor platform according to any one of embodiments 1-25; and a source of electromagnetic energy capable of heating said nanoparticles.

Embodiment 42

The system of embodiment 41, wherein said system includes a lens system, a mirror system, or a mask, and/or a positioning system to directing the electromagnetic energy to a specific region of said surface.

Embodiment 43

The system according to any one of embodiments 41-42, wherein said source of electromagnetic energy is a microwave source or a laser.

Embodiment 44

The system of embodiment 43, wherein said source of electromagnetic energy is a pulse laser.

BRIEF DESCRIPTION OF THE DRAWINGS

FIG. 1A illustrates a cell disposed on the micropillar array with resulting pillar deformations. FIG. 1B (top) shows a top view of a cell disposed on a micropillar array, and a dark field image of the micropillar array (bottom).

DETAILED DESCRIPTION

In various embodiments, a novel plasmonic cell force sensor platform is provided that affords superior force sensing accuracy across a large area. In certain embodiments the platform provides 30 nm pillar position accuracy under a 20× objective lens with a field-of-view (FOV) of 450 µm×340 µm, an area more than 10 times larger than conventional micropillar array approaches that demonstrated similar precision. This high position accuracy comes from the strong plasmonic scattering of plasmonic nanoparticles (e.g., gold nanoparticles) embedded in micropillars comprising the sensor platform. The plasmonic nanoparticles provide a strong signal-to-noise ratio and a point-source-like image pattern for sub-pixel resolution tracing even under a low magnification objective lens.

Figure 1A:
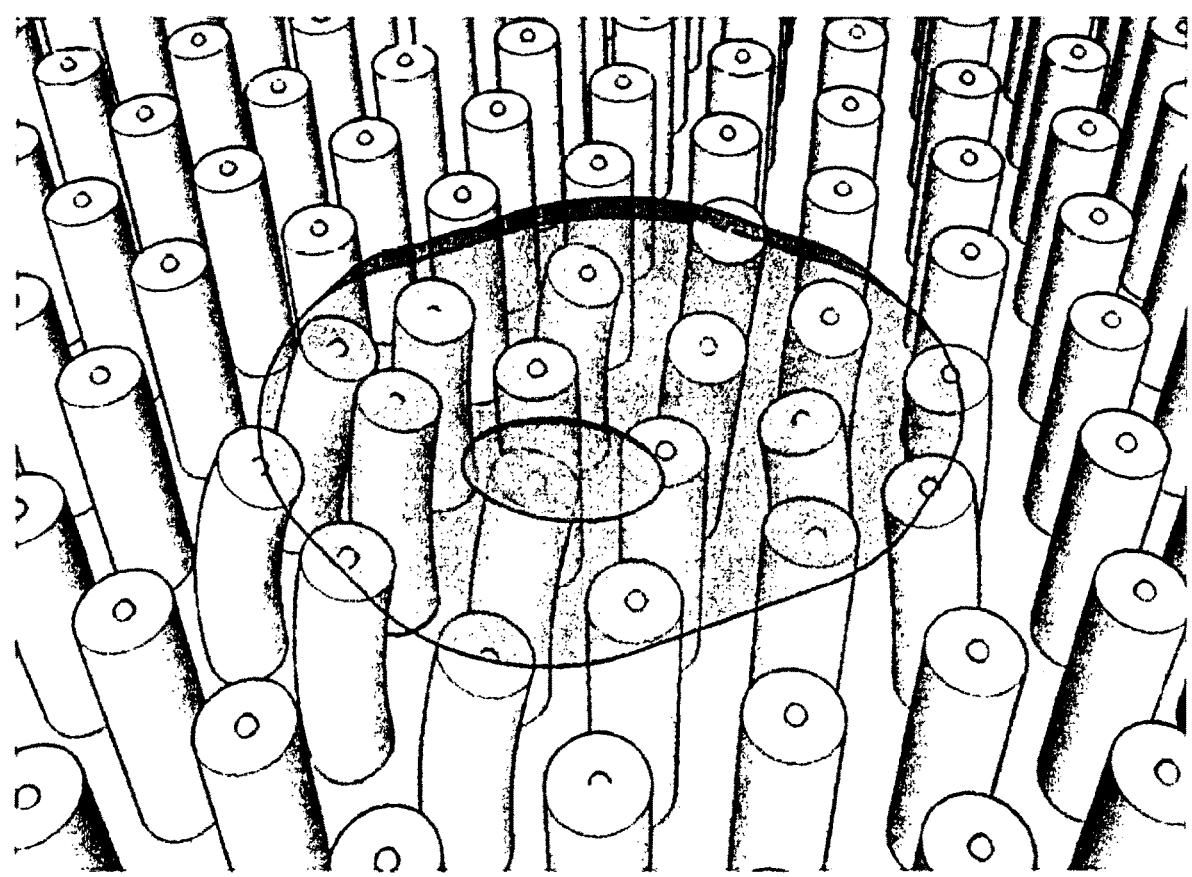
FIGS. 1A and 1B illustrate one embodiments of a plasmonic micropillar array.
Figure 1B:
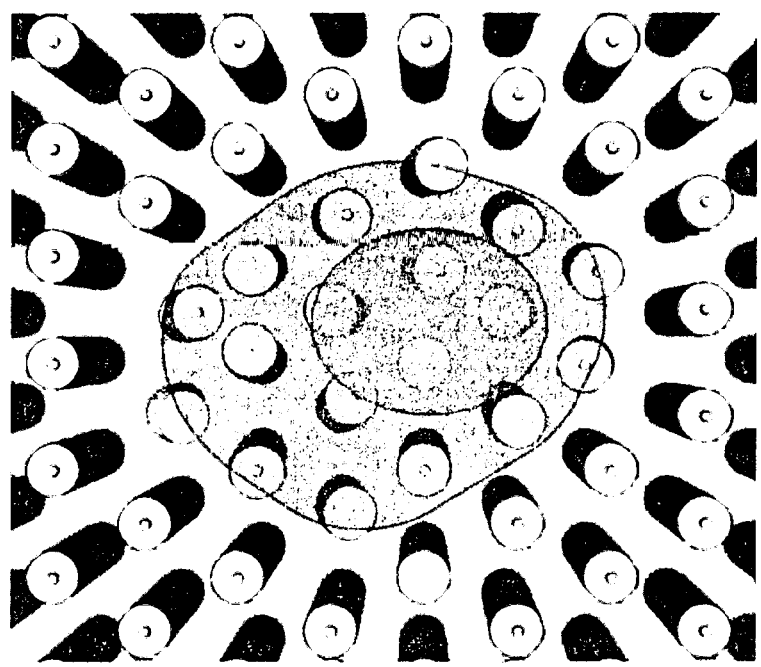
Figure 1B:
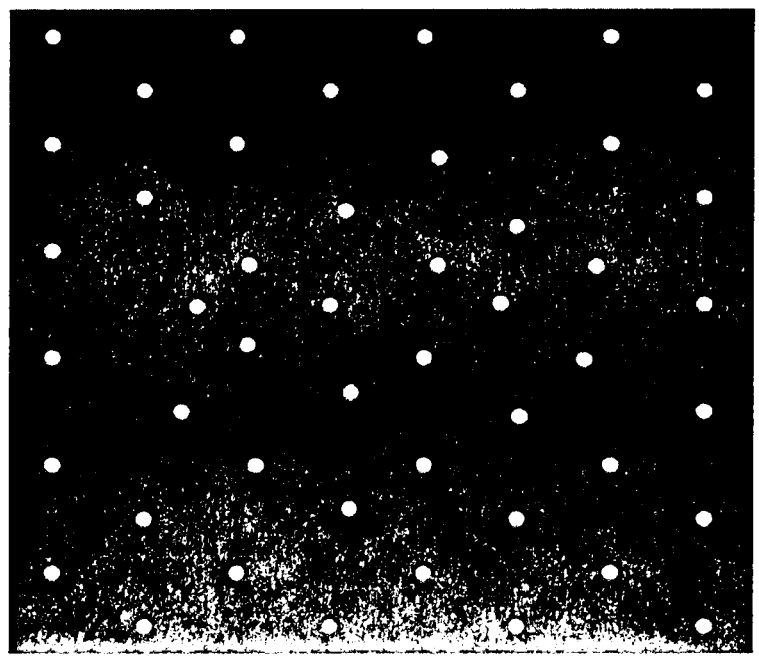

In various embodiments the force sensor platform comprises a plurality of micropillars, where micropillars comprising the plurality of micropillars each have a detectable nanoparticle disposed at the tip, e.g., as illustrated in FIGS. 1A and 1B (top panel). Illustrative detectable nanoparticle include, but are not limited to plasmonic nanoparticles, fluorescent nanoparticles (e.g., quantum dots), and the like. FIG. 1B (bottom panel) illustrates the appearance of the plasmonic nanoparticles at the micropillar tips in dark field microscopy.

In various embodiments the micropillars range in average diameter from about 0.1 µm up to about 25 µm or up to about 20 µm, or from about 0.1 µm, or from about 0.5 µm, or from about 1 µm up to about 25 µm, or up to about 20 µm, or up to about 15 µm, or up to about 10 µm, or up to about 5 µm.

While the micropillars typically have a substantially circular cross-section to provide uniform stiffness (resistance to bending) in all directions, in certain embodiments, the micropillars can be other regular polygons or asymmetric in cross-section. Thus, for example, where the micropillars are rectangular in cross-section they can offer greater stiffness in one direction (e.g., parallel to the long side of the rectangle) as compared to the direction normal to that.

In various embodiments the micropillars range in average length from about 1 µm up, or from about 2 µm, or from about 5 µm, up to about 100 µm, or up to about 75 µm, or up to about 50 µm, or up to about 40 µm, or up to about 30 µm, or up to about 20 µm, or up to about 15 µm, or up to about 10 µm. In certain embodiments the average length of the micropillars is about 10 µm or about 7 µm.

In various embodiments the spacing between adjacent micropillars ranges from about 0.5 µm up to about 25 µm, or from about 1 µm up to about 20 µm, or from about 2 µm up to about 15 µm, or from about 3 µm up to about 10 µm. In certain embodiments the spacing between adjacent micropillars ranges from about 2 µm up to about 5 µm.

The micropillars can be fabricated out of essentially any convenient material depending on the pillar dimensions and stiffness desired. In certain embodiments the micropillars are fabricated from a flexible polymer. Illustrative, but non-limiting polymer materials include polydimethylsiloxane (PDMS), polyolefin plastomer (POP), perfluoropolyethylene (PFPE), polyurethane, polyimides, and cross-linked NOVOLAC® (phenol formaldehyde polymer) resins, polyolefin plastomers, perfluoropolyethylene, polyurethane, polyimides, cross-linked phenol/formaldehyde polymer resins, and thiol-ene based polymers, and the like. In certain embodiments the flexible polymer is a polymer used for soft lithography (e.g., PDMS).

The plasmonic nanoparticles are of a size that permits disposition of the nanoparticle at the micropillar tip and -permits microscopy visualization. In various embodiments the plasmonic nanoparticle range in size from about 20 nm up to about 1000 nm, or up to about 500 nm, or up to about 400 nm in diameter (or largest dimension). The nanoparticle can be fabricated from any material that provides a detectable and localizable signal. In various embodiments the nanoparticles are plasmonic nanoparticles. Suitable materials for such nanoparticle include, but are not limited to metals (e.g., gold, silver, copper, tungsten, platinum, titanium, iron, manganese, and the like, or oxides, nitrides, or alloys thereof), semiconductor materials (e.g., CdSe, CdS, and CdS or CdSe coated with ZnS, and the like), multilayers of metals and/or metal alloys, and/or metal oxides or nitrides, and the like. In certain embodiments materials comprises one or more of the following: tungsten, tantalum, niobium, Ga, Au, Ag, Cu, Al, Ta, Ti, Ru, Ir, Pt, Pd, Os, Mn, Hf, Zr, V, Nb, La, Y, Gd, Sr, Ba, Cs, Cr, Co, Ni, Zn, Ga, In, Cd, Rh, Re, W, Mo, and oxides, nitrides, alloys, and/or mixtures and/or sinters thereof. Other useful materials include, but are not limited to ZnS, ZnO, $TiO_2$, AgI, AgBr, PbS, PbSe, ZnTe, CdTe, $In_2S_3$, $In_2Se_3$, $Cd_3P_2$, $Cd_3As_2$, InAs, GaAs, and the like. In certain embodiments the nanoparticles comprise a material selected from the group consisting of ruthenium, rhodium, palladium, silver, osmium, iridium, platinum, gold, copper, titanium, tungsten or an alloy, oxide, or nitride thereof. In certain embodiments the nanoparticles comprise gold or silver.

In various embodiments all the micropillars bearing nanoparticles at the tip comprise nanoparticles formed from the same material (e.g., gold, silver, etc.). However in certain embodiments, different micropillars comprise nanoparticles formed from different materials. In such instances the micropillars having different nanoparticles can provide different and distinguishable signals.

In various embodiments different shaped nanoparticles can be used. Illustrative, but non-limiting nanoparticles (nanoparticle shapes) that can be used in the devices described herein include, but are not limited to a hollow or solid nanosphere, a nanorod, a nanocube, a nano-octahedron, a nano-rhombic dodecahedron, a nanocrescent, a nanowire, a nanotube, a nanopyramid, a nanorod, a nanotoroid, a nanotetrepod, a single- or multi-layered nanodisk, and a nano-octopod nanoparticle. In various embodiments any of the nanoparticles described herein comprise a plasmonic material and/or are a plasmonic nanoparticle.

Different shapes and/or sizes of gold nanoparticles or other plasmonic nanoparticles give different scattering signals, even when they are all made of the same materials. Accordingly, in certain embodiments, the cell force sensor platform comprises a plurality of micropillars where different micropillars comprise different nanoparticle shapes and/or different nanoparticle sizes to provide different and distinguishable signals. In certain other embodiments all of the plurality of micropillars have the same shape and/or size nanoparticles.

As noted above, it is believed the force sensor platform(s) described herein provide a substantially higher pillar position accuracy over a larger field of view than has been obtained with any previous micropillar sensor. In certain embodiments the platform provides a pillar position accuracy of at least about 60 nm, or at least about 50 nm, or at least about 40 nm, or at least about 30 nm, or at least about 20 nm, or at least about 10 nm, or at least about 5 nm under an objective lens ranging from about 1× or from about 4× or from about 5×, or from about 10× up to about 40×, or up to about 60×, or up to about 80×, or up to about 100×. In certain embodiments the platform provides a pillar position accuracy of about 30 nm under a 20× objective lens (e.g., where the accuracy is under a 20× objective lens with a field of view (FOV) of 450 μm×340 μm).

In various embodiments the platform provides a force resolution of at least about 600 pN, or at least about 500 pN, or at least about 400 pN.

In various embodiments the force sensor platform comprises at least 10 micropillars, or at least 20 micropillars, or at least 50 micropillars, or at least 100 micropillars, or at least 250 micropillars, or at least 500 micropillars, or at least 1,000 micropillars, or at least 2,500 micropillars, or at least 5,000 micropillars, or at least 10,000 micropillars, or at least 50,000 micropillars, or at least 100,000 micropillars, or at least about 500,000 micropillars, or at least 1,000,000 micropillars, or at least 25,000,000 micropillars, or at least 50,000,000 micropillars, or at least 75,000,000 micropillars, or at least 100,000,000 micropillars. In certain embodiments a 4 cm×4 cm platform comprises at least 1,000,000 micropillars, or at least 25,000,000 micropillars, or at least 50,000,000 micropillars, or at least 75,000,000 micropillars, or at least 100,000,000 micropillars. In certain embodiments a 4 cm×4 cm platform comprises at least about 100,000,000 micropillars. In certain embodiments the platform comprises micropillars at a density of at least about 250,000/$cm^2$, or at least about 500,000/$cm^2$, or at least about 750,000/$cm^2$, or at least about 1,000,000/$cm^2$, or at least about 2,000,000/$cm^2$, or at least about 3,000,000/$cm^2$ or at least about 4,000,000/$cm^2$, or at least about 5,000,000/$cm^2$ or at least about 6,000,000/$cm^2$.

The area of the force sensor platform is essentially unlimited. In certain embodiments, for example, numerous force sensor platforms can be combined to provide larger platforms. In certain embodiments the pillars comprising the force sensor platform are disposed in an area ranging up to about 20 $cm^2$, or up to about 15 $cm^2$, or up to about 10 $cm^2$, or up to about 5 $cm^2$, or up to about 2 $cm^2$, or up to about 1 $cm^2$. In certain embodiments the force sensor platform is about 1 cm×1 cm, or about 1 cm by 2 cm, or about 2 cm×2 cm, or about 1 cm×3 cm, or about 2 cm×3 cm, or about 3 cm×3 cm, or about 1 cm×4 cm, or about 2 cm×4 cm, or about 3 cm×4 cm, or about 4 cm×4 cm, or about 1 cm×5 cm, or about 2 cm×5 cm, or about 3 cm×5 cm, or about 4 cm×5 cm, or about 5 cm×5 cm.

Figure 2:
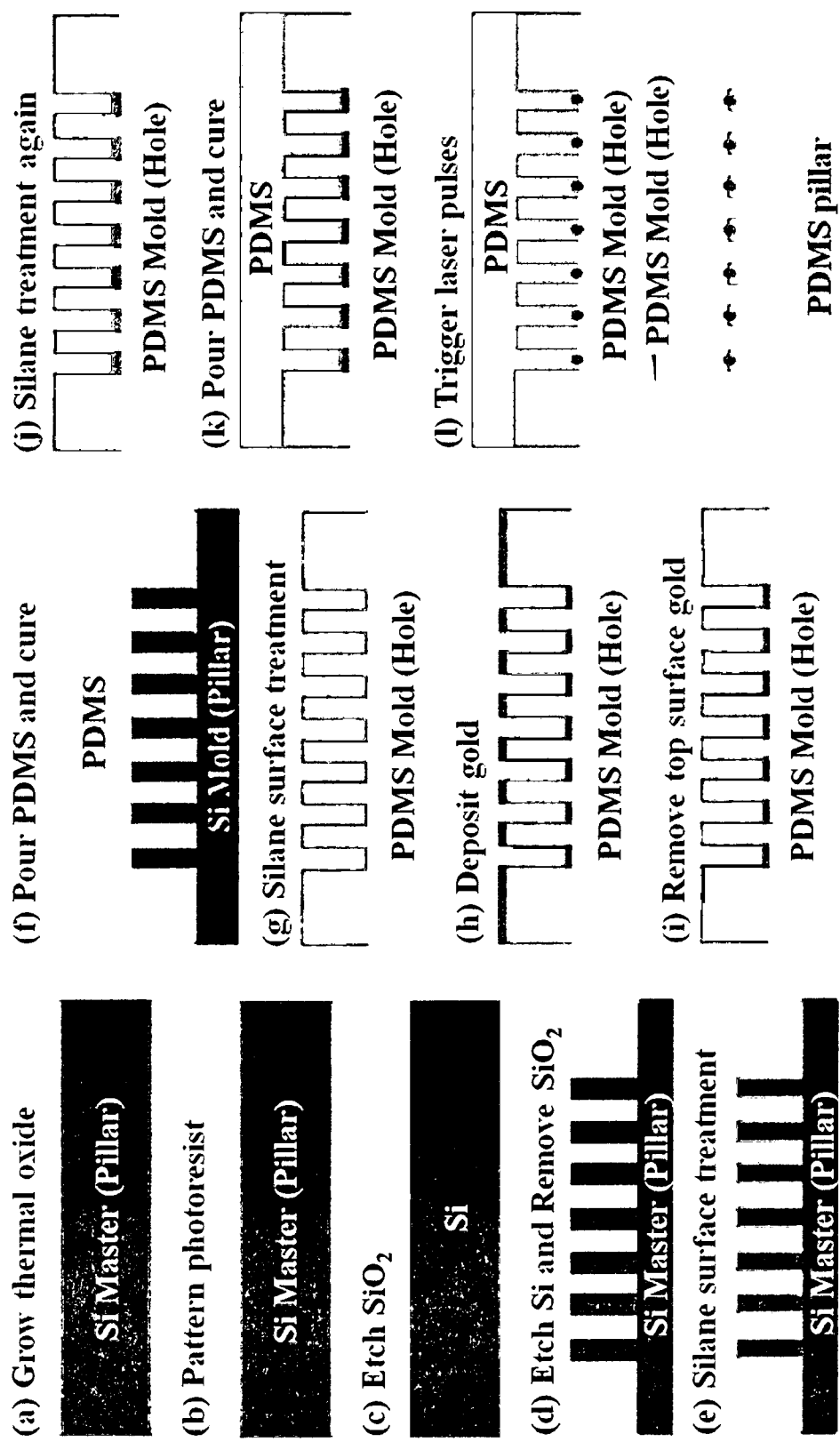
FIG. 2 schematically illustrates a fabrication process to apply laser-induced transfer to embed gold nanoparticles into PDMS micropillar array for high precision pillar position tracing.

One illustrative, but non-limiting method of fabricating the micropillar sensor is shown schematically in FIG. 2. One certain embodiments, the method involves i) preparing an array of wells that form a negative mold for a micropillar array;
ii) depositing a metal nanofilm over the negative mold where the metal nanofilm comprises the metal that will form the nanoparticles;
iii) removing the metal on the mold surface leaving metal microdisks in the bottom of the wells of the negative mold;
iv) filling the negative mold with a polymer that is to form the micropillars; and
v) melting the microdisks which transfer onto the tips of the micropillars formed by the polymer; and
vi) removing the micropillar array from the negative mold.

It will be recognized that where the nanoparticle is not a metal nanoparticle, the nanofilm need not be a metal nanofilm, but simply a nanofilm comprising the material that is to form the nanoparticle.

The negative mold can be fabricated using a number of methods know to those of skill in the art. In one embodiment, as illustrated in FIG. 2, the pillar array is first fabricated on a silicon substrate as a master mold by standard microfabrication techniques (e.g., a patterned photoresist followed by an etching step). A complimentary well array in a negative mold is obtained by casting a soft lithograph material (e.g., PDMS) on the master mold, e.g., as illustrated in FIG. 2, panel (f). After silane treatment a metal nanofilm (e.g., an $SiO_2$/Ti/Au multilayer nanofilm) is deposited all over the negative (e.g., PDMS) mold and metal on the mold surface is later removed, e.g., using tape. Metal microdisks left in the bottom of the wells are then covered by the material that is to form the pillars (e.g., PDMS) and irradiated by a laser (e.g., by nanosecond laser pulses). These metal disks (e.g., gold disks) are melted and evolve, driven by the strong surface tension of the molten metal (e.g., molten gold), into nanoparticles, that are found to be transferred into the tips of PDMS pillars after demolding.

Figure 3A:
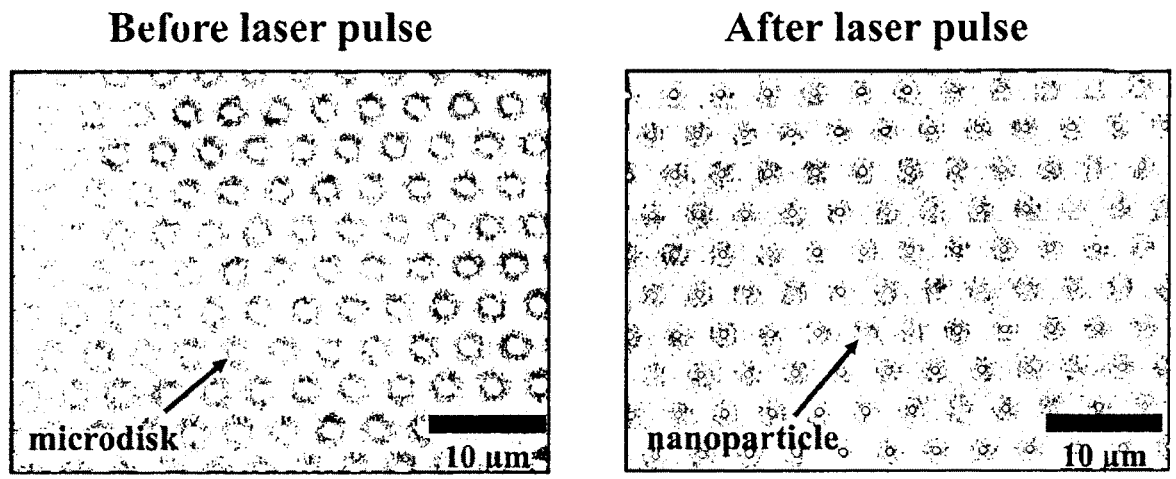
FIG. 3A Gold microdisks sandwiched between PDMS pillars and a mold are melted by laser pulses to form nanoparticle and transfer into pillars.
Figure 3B:
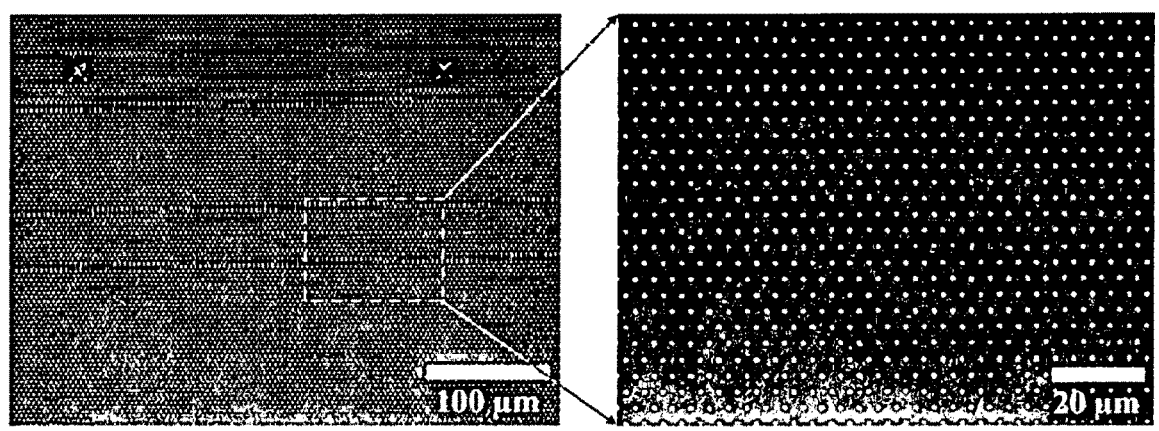
FIG. 3B shows images of the pillar immersed in an aqueous solution and imaged with a 20× objective lens in dark field mode. Gold nanoparticle strongly scanner on an otherwise dark background and the PDEMS pillars are invisible. 97.5% of nanoparticles within the FOV of a 20× objective lens are successfully transferred.
Figure 4:
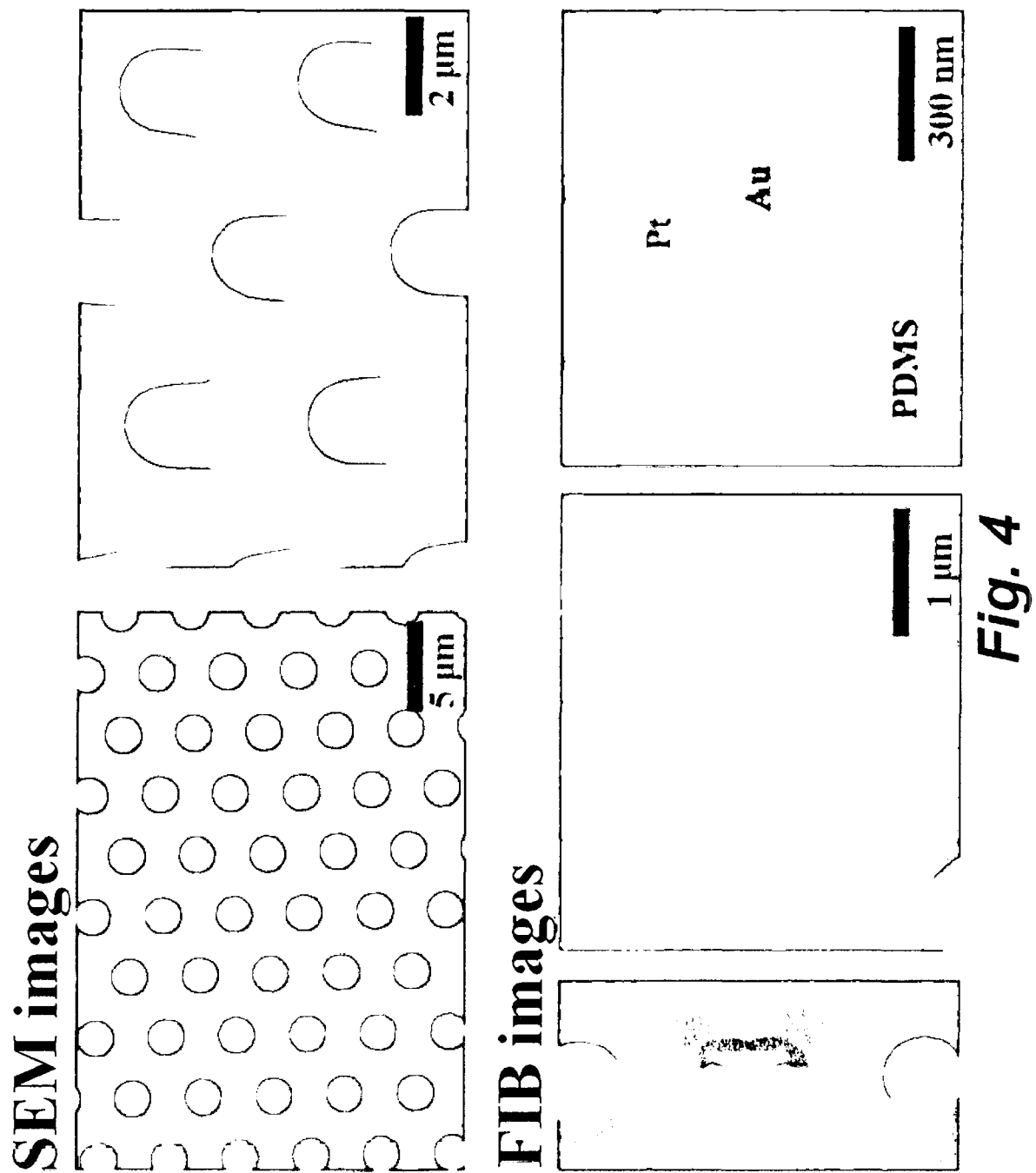
FIG. 4 provides SEM and FIB of the pillars showing that each pillar has one gold nanoparticle anchored in the pillar tip.

The shape evolution of a metal microdisk (e.g., a gold microdisk) sandwiched between a PDMS pillar and its mold is shown in FIG. 3A. Nanoparticles within the laser-irradiated area are transferred into micropillars as shown in FIG. 3B. The focused ion beam (FIB) image (FIG. 4) show that the nanoparticles are partially embedded in the tips of these pillars. Under a low magnification optical system, these nanoparticles serve as point-source-like light sources that strongly scatter light under dark field mode microscopy imaging, and provide superior signal-to-noise ratio to the background pillar and cell scattering signals for high precision position tracing.

Figure 5:
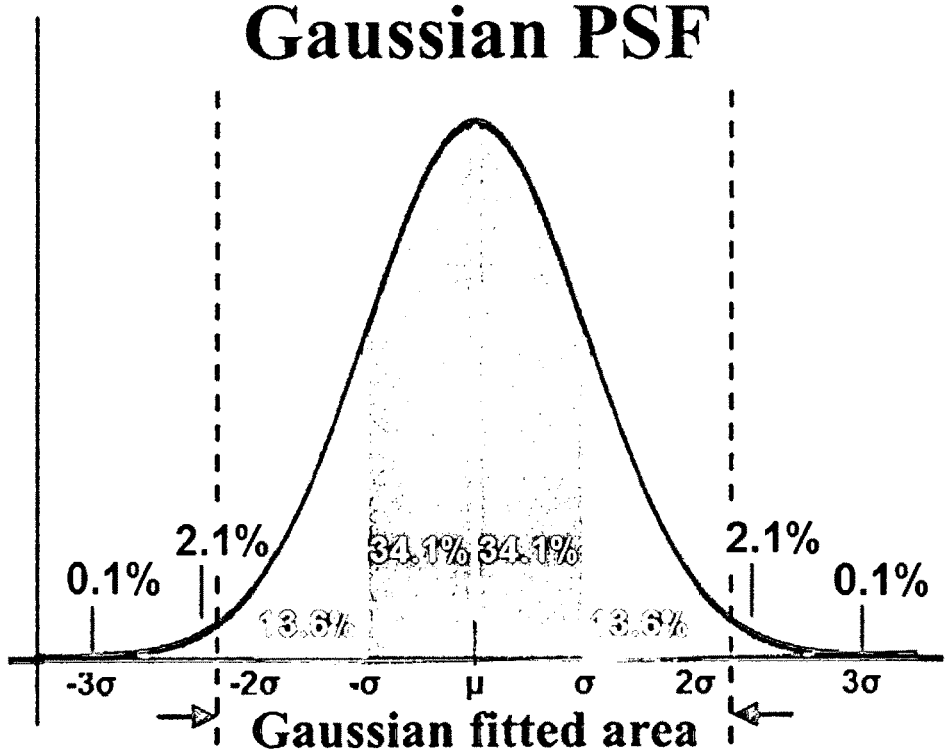
FIG. 5 illustrates that the nanoparticle on the pillar can be considered a point source when imaged in low magnified imaging system and thus can be fitted by Gaussian point spread function (PSF) with subpixel precision.
Figure 5:
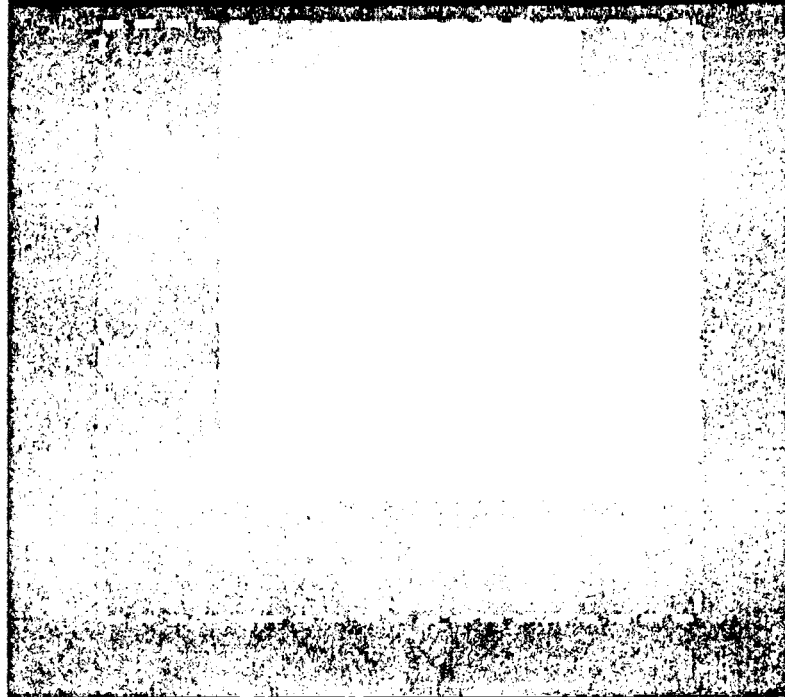
Figure 6:
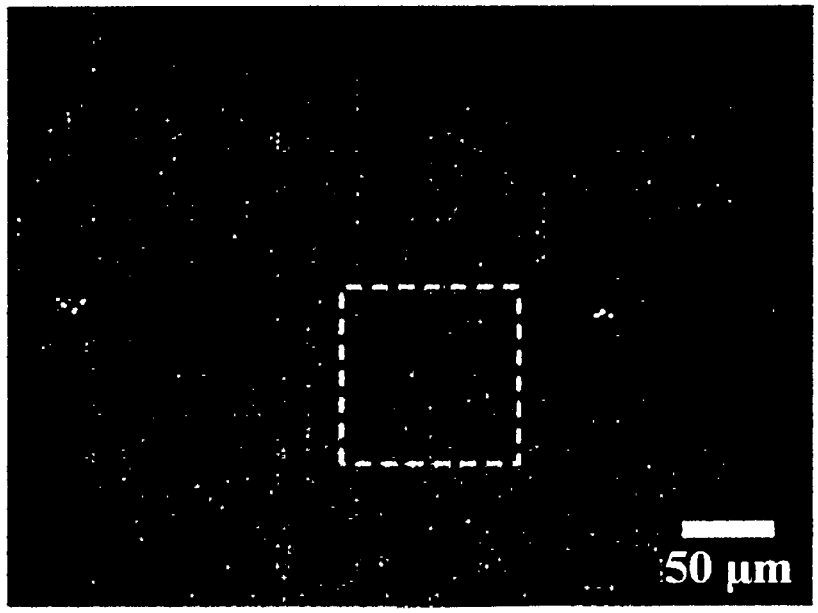
FIG. 6, panels A-D, show images under a 20× objective lens. Panel A: Reference image of pillars before cells are plated; Panel B: Pillar images with cells growing on top; Panel C: Fluorescent image of cells stained by WGA 594; Panel D: Superposition of (panel B) and (panel C) to confirm that deflection of pillar is caused by cell force.
Figure 6:
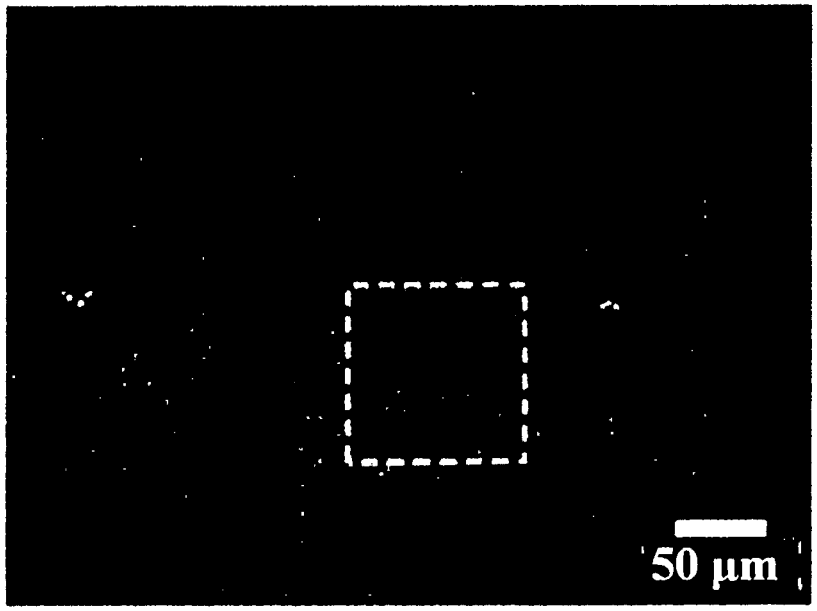
Figure 7:
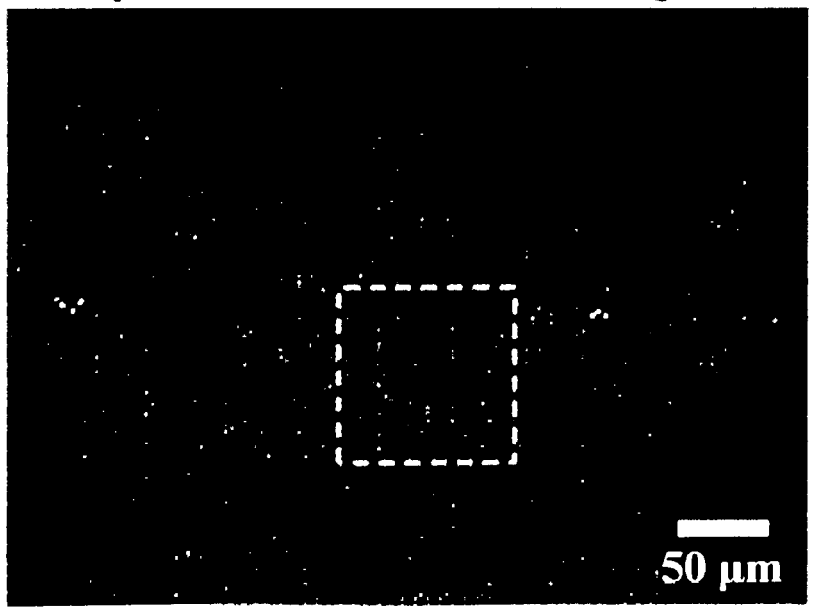
FIG. 7, panels A-D, illustrates the precision of the plasmonic micropillars (30 nm resolution under 20× objective lens). Panel A: Reference image; Panel B: Cell image+ fluorescence image; Panel C: Same area of pillars in images with and without cells are selected to quantify system precision. Gaussian fitted positions of selected pillars (blue from image (FIG. 6, panel A), red from image (FIG. 6, panel B) are aligned and superpositioned. Panel D: Histogram of apparent displacement of these pillars at rest gives the pillar localization precision of 30 nm.
Figure 7:
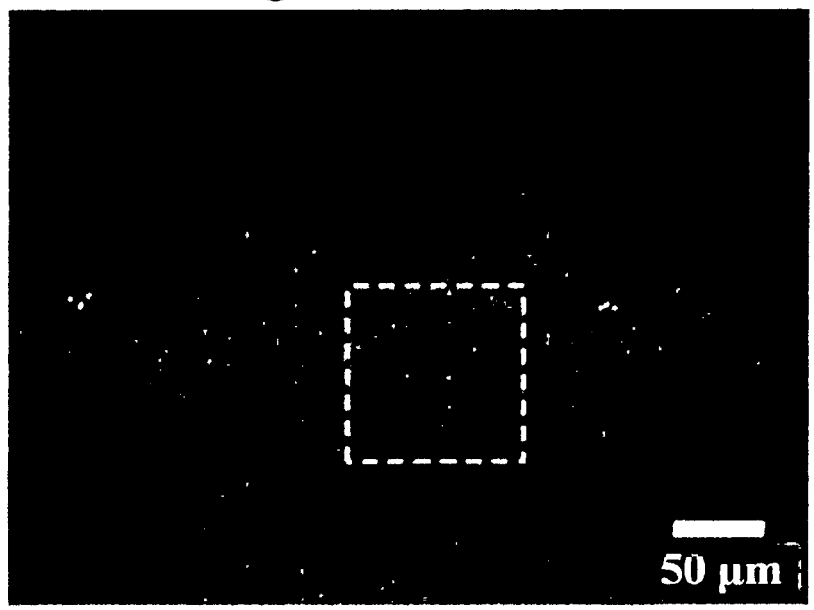

In order to study the position accuracy of the micropillars for force sensing under a 20× objective lens, Madin-Darby Canine Kidney epithelial cells (MDCK cells) were grown on the device. Dark field images shown in FIG. 6, panel A, were first taken before the cells were plated. The undeflected pillar position was determined by Gaussian fitting the image of gold nanoparticles, e.g., as shown in FIG. 5. With cells growing on top, the pillars respond to cell traction forces and bend. This deflection was captured again as shown in FIG. 6, panel B. An area of pillars away from any cell in FIG. 6, panel B can be selected to compare with the same area in FIG. 6, panel A to determine the position accuracy of these micropillars in the imaging and position fitting system (FIG. 7, panel C). In FIG. 7, panel D the histogram of the apparent displacement of these pillars at rest shows that the spatial resolution of our plasmonic micropillar platform is ~30 nm.

Figure 8:
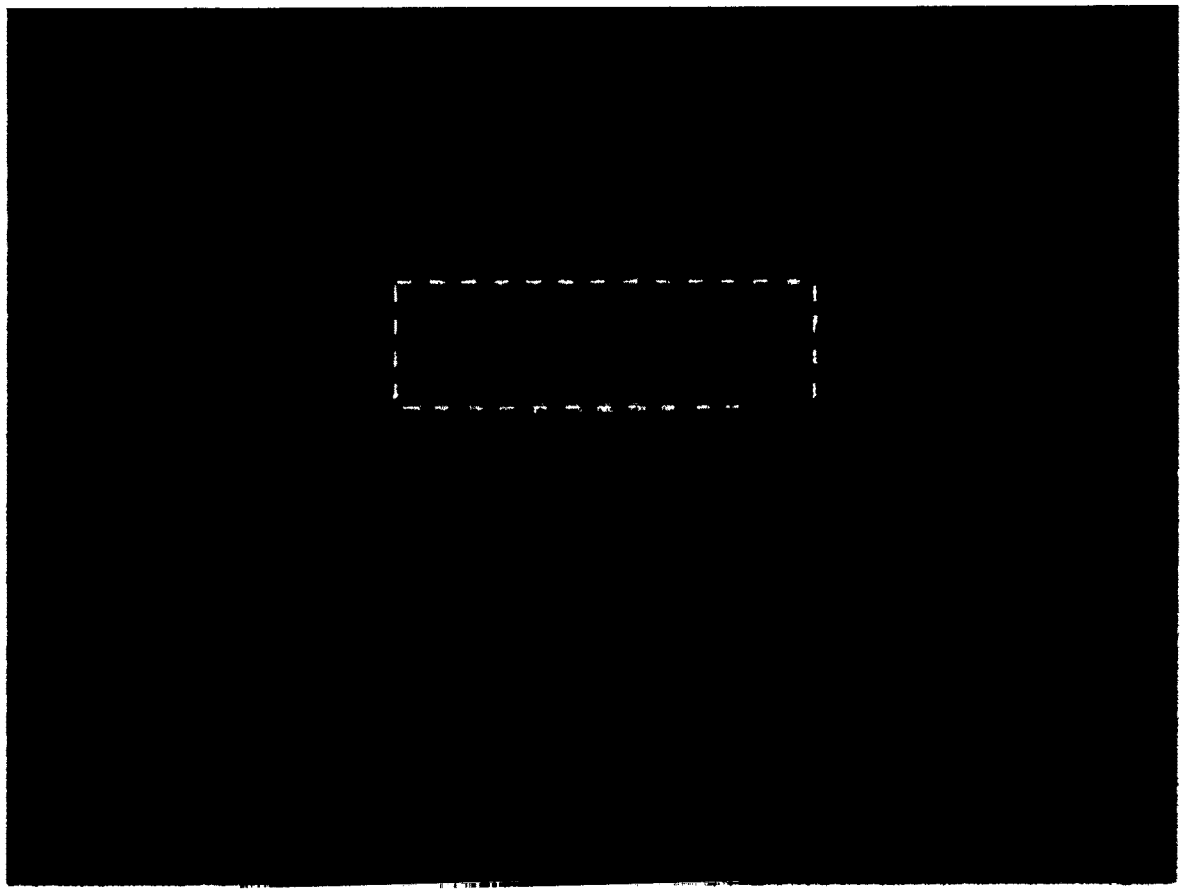
FIG. 8 illustrates the determination of a cell force map. A reference image and cell image are aligned. The fitted position of corresponding pillar from two images is subtracted to determine deflection of a pillar. Cell force is the product of the pillar deflection and the pillar stiffness.
Figure 8:
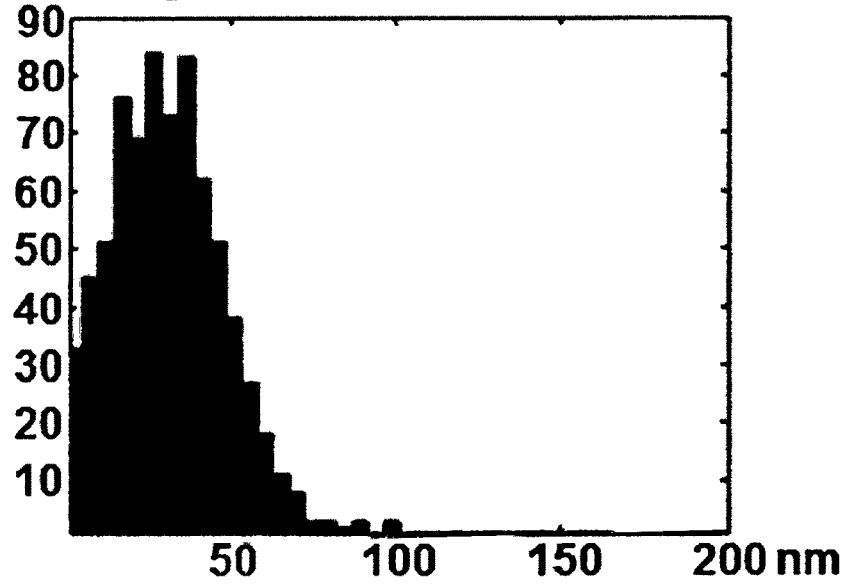

FIG. 8 illustrates the determination of a cell force map. A reference image and cell image are aligned. The fitted position of corresponding pillar from two images is subtracted to determine deflection of a pillar. Cell force is the product of the pillar deflection and the pillar stiffness.

Figure 9:
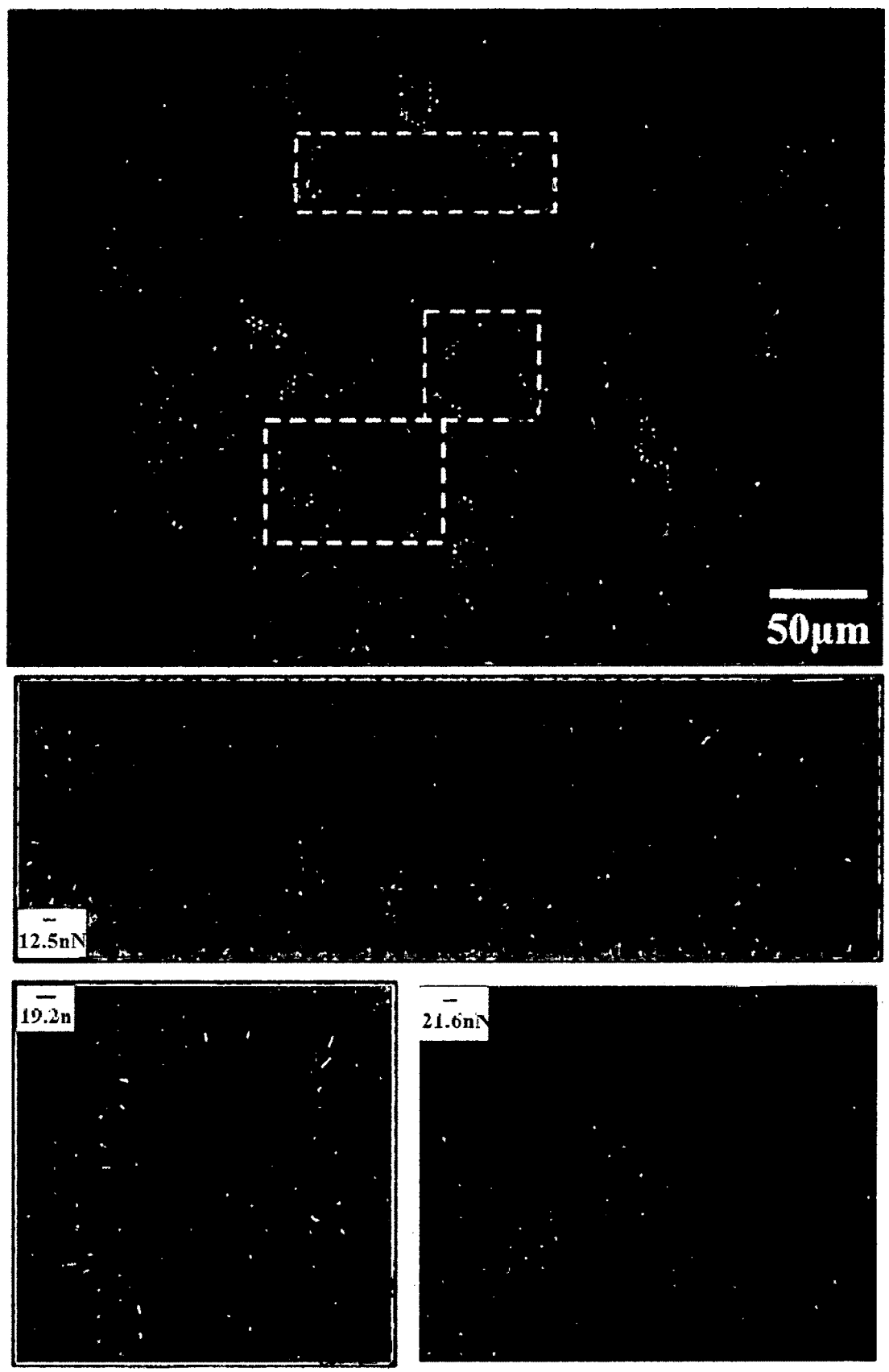
FIG. 9. Cell force map imaged by a 20× objective lens. The force vectors are drawn on the fluorescent image of cells. In the illustrated embodiment a force resolution of 400 pN was obtained.

Cell forces can be calculated (e.g., by home-developed MATLAB codes and are usually represented by vectors drawn on each pillar whose length is proportional to the force magnitude. FIG. 9 gives the force map of MDCK cells growing on top of the pillar array.

In various embodiments this platform can be used to measure the stiffness of cells through the cell force and deformation measurement of the pillars. The differences in stiffness can be used to identify differences in cells. For example, cancer cells have been shown to have very different stiffness compared with normal cells.

In various embodiments this platform can be used in drug development by measuring cell force or stiffness as altered by treatment with particular drugs (e.g., candidate anticancer drugs).

In various embodiments this platform can be used for large area cell mechanotype monitoring, for example, during induced epithelial-to-mesenchymal transition in cancer cells, in transdifferentiation from lipofibroblasts to myofibroblasts in lung cells, and the like.

In certain embodiments the embedded nanoparticles at the top of the pillars can serve as heat sources when irradiated (e.g., via optical irradiation, microwave irradiation, and the like). This permits selective cell ablation at the single cell level or subcellular level. Real time monitoring of cell forces in reaction to photothermal treatment applied by laser irritated nanoparticles is also possible.

In certain embodiments by irradiating the nanoparticles with a pulse laser, nanocavitation bubbles can be induced at the pillar top which can porate cells cultured on the platform. High throughput, large area intracellular delivery of functional cargo into cells is feasible at the single cell or sub-cellular level resolution.

[1] M. Ghibaudo, A. Saez, L. Trichet, A. Xayaphoummine, J. Browaeys, P. Silberzan, A. Buguin and B. Ladoux, "Traction forces and rigidity sensing regulate cell functions", Soft Matter, 2008, Vol. 4, 1836-1843.

[2] J. Fu, Y. Wang, M. T. Yang, R. A. Desai, X. Yu, Z. Liu & C. S. Chen, "Mechanical regulation of cell function with geometrically modulated elastomeric substrates", Nature methods, 2010, Vol. 7, No. 9, 733-736.

[3] A. Saez, M. Ghibaudo, A. Buguin, P. Silberzan, and B. Ladoux, "Rigidity-driven growth and migration of epithelial cells on microstructured anisotropic substrates", PNAS, 2007, Vol. 104, No. 20, 8281-8286.

[4] M. T. Yang, N. J. Sniadecki, and C. S. Chen, "Geometric considerations of micro- to nanoscale elastomeric post arrays to study cellular traction forces", Adv. Mater. 2007, 19, 3119-3123.

[5] X. Trepat, M. R. Wasserman, T. E. Angelini, E. Millet, D. A. Weitz, J. P. Butler, and J, J. Fredberg, "Physical forces during collective cell migration", Nature Physics, 2009, Vol. 5, 426-430.

[6] A. Rabodzey, P. Alcaide, F. W. Luscinskas, and B. Ladoux, "Mechanical forces induced by the transendothelial migration of human neutrophils", Biophysical Journal, 2008, Vol. 95, No. 3, 1428-1438.

[7] K. NoelDahl, E. A. Booth-Gauthier, and B. Ladoux, "In the middle of it all: mutual mechanical regulation between the nucleus and the cytoskeleton", J. Biomechanics, 2010, Vol. 43, No. 1, 2-8.

[8] Z. Liva, J. L. Tanb, D. M. Cohena, M. T. Yang, N. J. Sniadecki, S. A. Ruiz, C. M. Nelson, and C. S. Chen, "Mechanical tugging force regulates the size of cell-cell junctions", PNAS, 2010, Vol. 107, No. 22, 9944-9949.

[9] Y. Sun, L. G. Villa-Diaz, R. H. W. Lam, W. Chen, P. H. Krebsbach, J. Fu, "Mechanics regulates fate decisions of human embryonic stem cells", PLoS ONE, 2012, Vol. 7, No. 5, e37178.

[10] A. Brugués, E. Anon, V. Conte, J. H. Veldhuis, M. Gupta, J. Colombelli, J. J. Muñoz, G. W. Brodland, B. Ladoux, and X. Trepat, "Forces driving epithelial wound healing", Nature Physics, 2014, Vol. 10, 683-690.

[11] H. Hoorn, R. Harkes, E. M. Spiesz, C. Storm, D. Noort, B.t Ladoux, and T. Schmidt, "The nanoscale architecture of force-bearing focal adhesions", Nano Lett., 2014, Vol. 14, 4257-4262.

[12] J. L. Tan, J. Tien, D. M. Pirone, D. S. Gray, K. Bhadriraju, and C. S. Chen, "Cells lying on a bed of microneedles: an approach to isolate mechanical force", PNAS, 2003, Vol. 100, No. 4, 1484-1489.

[13] A. Saez, E. Anon, M. Ghibaudo, O. du Roure, J.-M. Di Meglio, P. Hersen, P. Silberzan, A. Buguin, and B. Ladoux, "Traction forces exerted by epithelial cell sheets", J. Phys.: Condens. Matter, 2010, Vol. 22, 194119.

[14] O. Roure, A. Saez, A. Buguin, R. H. Austin, P. Chavrier, P. Siberzan, and B. Ladoux, "Force mapping in epithelial cell migration", PNAS, 2005, Vol. 102, No. 7, 2390-2395.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of fabricating a cell force sensor platform comprising a plurality of micropillars, wherein micropillars comprising said plurality of micropillars each have a single plasmonic nanoparticle disposed at the tip, said method comprising:
   preparing an array of wells that form a negative mold for a micropillar array;
   depositing a metal nanofilm over said negative mold wherein said metal nanofilm comprises the metal that will form the nanoparticles;
   removing the metal on the mold surface leaving metal microdisks in the bottom of the wells of said negative mold;
   filling the negative mold with a polymer that is to form the micropillars; and
   melting the microdisks which transfer onto the tips of the micropillars formed by said polymer; and
   removing the micropillar array from the negative mold.

2. The method of claim 1, wherein preparing an array of wells comprises casting said negative mold using a soft lithography polymer on a positive master mold.

3. The method of claim 2, wherein said soft lithography polymer is PDMS.

4. The method of claim 2, wherein said master mold is formed by etching a silicon substrate.

5. The method claim 1, wherein said depositing a metal nanofilm comprises depositing comprises depositing one or more layers of metal comprising a metal selected from the group consisting of ruthenium, rhodium, palladium, silver, osmium, iridium, platinum, gold, copper, titanium, tungsten or an alloy, oxide, or nitride thereof.

6. The method of claim 1, wherein said depositing a metal nanofilm comprises depositing a multi-layer metal nanofilm.

7. The method of claim 6, wherein said multilayer metal nanofilm is an SiO2/Ti/Au multilayer nanofilm.

8. The method of claim 1, wherein said removing comprises using tape to remove metal on the mold surface.

9. The method of claim 1, wherein said melting is by irradiation with laser pulses.

10. The method of claim 9, wherein said melting is by irradiation with nanosecond laser pulses.

* * * * *